E. W. GOODWIN.
FASTENING DEVICE FOR AUTOMOBILE TOPS.
APPLICATION FILED MAY 5, 1919.
1,434,351.
Patented Oct. 31, 1922.
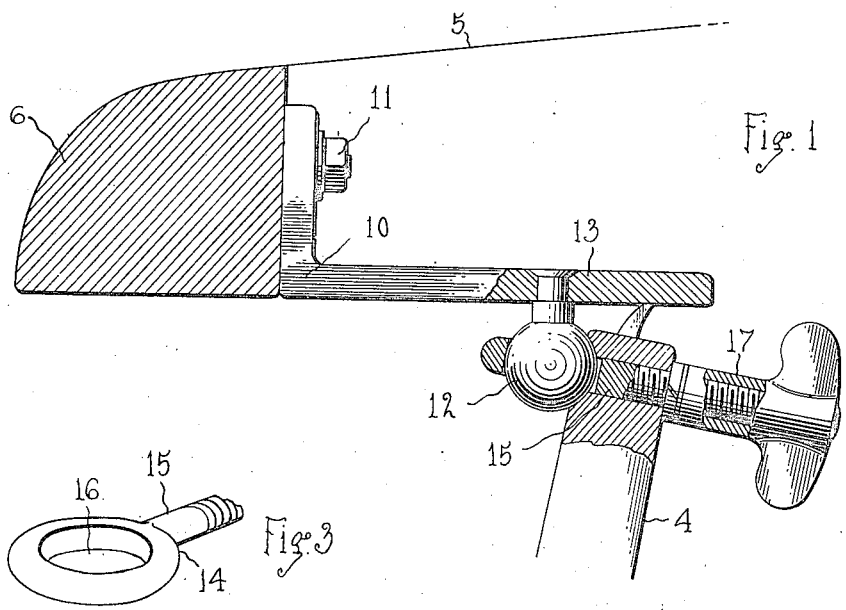
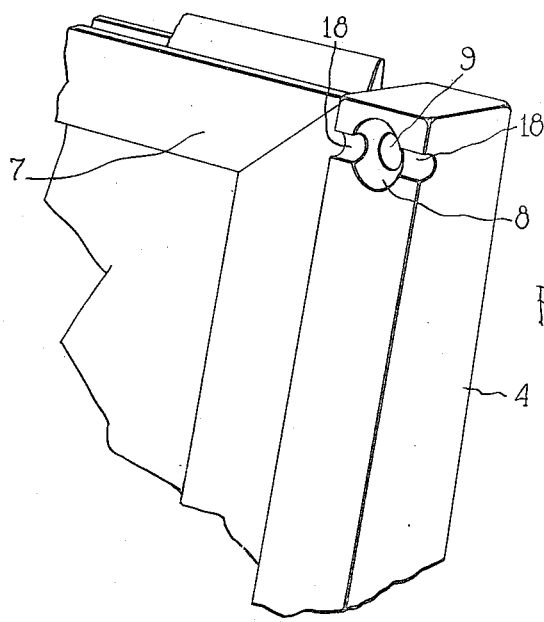
Inventor
Edward W. Goodwin
By his Attorney
Lloyd Blackmore Patented Oct. 31, 1922.

1,434,351

UNITED STATES PATENT OFFICE.

EDWARD W. GOODWIN, OF DETROIT, MICHIGAN, ASSIGNOR TO GENERAL MOTORS CORPORATION, OF DETROIT, MICHIGAN, A CORPORATION OF DELAWARE.

FASTENING DEVICE FOR AUTOMOBILE TOPS.

Application filed May 5, 1919. Serial No. 294,774.

*To all whom it may concern:*

Be it known that I, EDWARD W. GOODWIN, a citizen of the United States, and resident of Detroit, Wayne County, State of Michigan, have invented certain new and useful Improvements in Fastening Devices for Automobile Tops, of which the following is a specification.

My invention relates to fastening devices designed for use in automobiles and similar vehicles to fasten the front end of a top or canopy to the upper ends of oppositely located upright stanchions located adjacent the forward end of the vehicle, the top being ordinarily of the collapsible or folding type and the stanchions in addition ordinarily serving as supports for the two ends of a transparent wind-shield.

The object of my invention is to provide an improved fastening device of the class or type above referred to which will be simple in construction, easy to operate, and effective for the end for which it is designed; and in which the detachable connection provided between the upper ends of the stanchions and the top has a certain amount of flexibility, so that relative movement of the parts fastened together due to movements in the vehicle body and top may occur without straining the fastenings in question.

With the above end and other objects of invention in view, my invention consists in the improved fastening device illustrated in the accompanying drawing and hereinafter described, the particular features wherein the invention consists being pointed out in the concluding claims.

The preferred embodiment of my invention is illustrated in the drawing accompanying and forming a part of this specification, although it will be appreciated that the same may be embodied in various other forms so long as the same come within the scope of the concluding claims.

In the drawing:

Figure 1 is a view showing the upper end of a stanchion and the forward end of a top secured together by means of my improved fastening device;
Figure 2 is a perspective view showing the upper end of the stanchion and a portion of the wind-shield; and, Figure 3 is a view showing the forward end of a securing member forming a part of my invention and whereby the parts thereof are secured together.

Referring to the drawing, the reference numeral 4 designates one of two oppositely disposed upright stanchions located at the forward end of a vehicle, it being understood that a locking device such as is hereinafter described will be provided at the upper end of each of the two oppositely located stanchions, although the locking device cated stanchions, although the locking device will be hereinafter described in the singular because one only of the two locking devices used in a particular vehicle is illustrated.

The reference numeral 5 designates conventionally the front end of the top or canopy of a vehicle, the same being ordinarily of the folding type so that it can be pushed back from over the body of the vehicle, such tops being ordinarily provided with a transversely extending bar 6 at the forward end to which the fabric covering is secured. The upright stanchions 4 ordinarily support a wind-shield between them, the same being shown in a conventional manner and designated by the reference numeral 7 in Figure 2 of the drawing.

Located adjacent the upper end of the stanchion 4 is a recess or seat 8, and a passage 9 communicates with this recess and extends transverse to the stanchion and through the same, as best shown in Figure 1. The recess 8 is illustrated as spherical in form, although its form may be varied, the spherical form being adopted because of the fact that the locking head to be next described, and which fits into and is secured in place within the said recess, is preferably of spherical form.

The reference numeral 10 designates a bracket secured to the top 5 preferably by means of screws 11 extending into the forward cross bar 6 of the top. This bracket is provided with a locking head or projection adapted to lie within the recess 8 when the parts are locked together; said head being designated by the reference numeral 12 and the same being shown as spherical in form, although its form may be varied without departing from my invention. The said head or projection is shown as carried by and depending from an arm 13 of the bracket 10 extending rearward from the cross bar 6, so that the forward end of the top when secured to the upper ends of the stanchions extend some little distance in front of the stanchions.

The head or projection 12 is secured in place within the recess 8 when the top is to be locked to the upper end of the stanchions by means of a securing member adapted to engage the head and clamp it in place within the socket, said securing member being shown as in the form of an eye member 14 having a threaded shank 15 adapted to extend through the transverse opening 9 above referred to; the opening 16 of the eye member being of sufficient size and of such form as to receive the locking head or projection 12, the same being obviously circular in form in case a spherical locking head is used as is the case in the embodiment of my invention illustrated. A wing nut 17 is in threaded engagement with the shank 15 of the securing member 14 whereby said member may be drawn tight, and the projection or head 12 clamped in place within the recess 8 provided to receive it.

The upper ends of the stanchions 4 are provided with cross slots or recesses 18 leading into the recess 8, and within which the circular forward or left-hand end of the eye member 14 lies when the parts are assembled, said slots or recesses obviously acting to prevent the securing member as a whole from rotating with the nut 17 as the nut is tightened to thereby secure the parts of the fastening device together.

In view of the premises, it will be appreciated that the top 5 after being unfolded, and its forward end brought into a position adjacent the upper ends of the stanchions, may be secured in place and to the stanchions through and by means of the fastening device above described and wherein my invention consists. The fact that the head 12 fits into a recess in the stanchions and is held in place therein prevents upward or downward movement of the forward end of the top, as will be appreciated, while the form of the cooperating surfaces of the locking head and recess within which it is secured permits a certain amount of movement of the parts relative to one another, without disturbing the locking engagement between them.

The connection between the stanchions and top may obviously be loosened and disconnected by unscrewing the nuts 17, and it will be appreciated that the cross slots 18 prevent the securing member from rotating with the nut as the same is loosened and tightened, as the rear portion of the end of the securing or eye member which is provided with the opening 16 lies within said slots when the parts are assembled.

Having thus described and explained my invention, I claim and desire to secure by Letters Patent:

1. In a fastening device of the class described and in combination with a vehicle top; an upright stanchion having a curved recess corresponding substantially in form with a portion of a sphere and located adjacent its upper end, and a transversely extending passage connecting with said recess; a bracket carried by said top and having a locking head substantially spherical in form and adapted to enter the recess aforesaid and to rock therein; a securing member having an opening of such size as to receive said locking head, and a threaded shank extending through the transverse passage aforesaid and movable longitudinally therein to draw said locking head into said recess; and a nut in engagement with said shank and adjustable thereupon to impart longitudinal movement to said securing member along the transversely extending passage aforesaid.

2. In a fastening device of the class described and in combination with a vehicle top; an upright stanchion having a curved recess adjacent its upper end, and the form of which recess corresponds approximately with the form of a portion of a sphere; a bracket carried by said top and having a locking head substantially spherical in form and adapted to enter the recess aforesaid and to rock therein; and a securing member located adjacent the upper end of said stanchion and adapted to engage said spherical head and to hold it in place within said recess.

3. In a fastening device of the class described and in combination with a vehicle top; an upright stanchion having a curved recess substantially spherical in form adjacent its upper end, and a transversely extending passage connecting with said recess; a locking head substantially spherical in form supported from said top and adapted to enter the recess aforesaid and to rock therein; a securing member adapted to engage said head and which securing member is provided with a threaded shank extending through said passage and movable along the same to clamp said head in place within said recess; and a nut engaging the threaded shank and whereby said head may be clamped in place within said recess.

4. In a fastening device of the class described and in combination with a vehicle top; an upright stanchion having a curved recess substantially spherical in form adjacent its upper end and disposed upon the front side thereof; a locking head substantially spherical in form supported from said top and adapted to lie in front of the upper end of said stanchion and within the recess aforesaid, and to rock within said recess; and a clamping member carried by said stanchion and engaging said head to thereby hold the same in position within said recess.

5. In a fastening device of the class described and in combination with a vehicle top; an upright stanchion having a substantially spherical shaped recess adjacent its upper end and upon the front side thereof, a transversely extending passage communicating with said recess, and two laterally extending cross slots communicating also with said recess; a locking head substantially spherical in form carried by said top and disposed in front of the upper end of said stanchion, and which head is adapted to enter the recess aforesaid and to rock therein; a securing member having an opening or eye of such size as to receive said projection, and a threaded shank extending through the transverse passage aforesaid and movable longitudinally therein to draw said locking head into said recess; and a nut in engagement with said shank, and adjustable thereupon to impart longitudinal movement to said securing member along the transversely extending passage aforesaid; the arrangement of the parts being such that portions of said locking member upon each side of the shank lie within the laterally extending cross slots aforesaid.

In testimony whereof I affix my signature.

EDWARD W. GOODWIN.